United States Patent [19]
Jenkner

[11] Patent Number: 4,676,132
[45] Date of Patent: Jun. 30, 1987

[54] DEVICE FOR SUPPORTING A LONG AND NARROW WORKPIECE BUNDLE PRODUCED ON A PANEL SPLITTING SAW

[76] Inventor: Detlef Jenkner, Schwarzwaldstrasse 68, Herrenberg, Fed. Rep. of Germany, D-7033

[21] Appl. No.: 873,725

[22] Filed: Jun. 12, 1986

[30] Foreign Application Priority Data

Jun. 13, 1985 [DE] Fed. Rep. of Germany ....... 3521210

[51] Int. Cl.⁴ ............................................... B27B 5/06
[52] U.S. Cl. ........................................ 83/437; 83/278; 83/467 R; 83/29
[58] Field of Search ..................... 83/29, 84, 268, 278, 83/409, 437, 467

[56] References Cited

U.S. PATENT DOCUMENTS 1,969,503 8/1934 Eksergian .............................. 83/251
3,820,431 6/1974 Peddinghaus ..................... 83/278 X Primary Examiner—James M. Meister
Attorney, Agent, or Firm—Dick and Harris

[57] ABSTRACT

A device with the aid of which the first workpiece bundle, in particular, of long and narrow configuration, severed on a panel splitting saw from a workpiece stack which is to be split up into single workpiece bundles, is held in such a way that upon termination of an advancing motion, it cannot tilt over in the direction of advance, is described. To this end, the device is characterized by a counter holding member which is drivable parallel to the cutting plane of the panel splitting saw which splits up the workpiece stack from a position of rest into a stop position engaging the workpiece bundle, and which is movable together with the workpiece bundle in the direction of advance.

6 Claims, 5 Drawing Figures

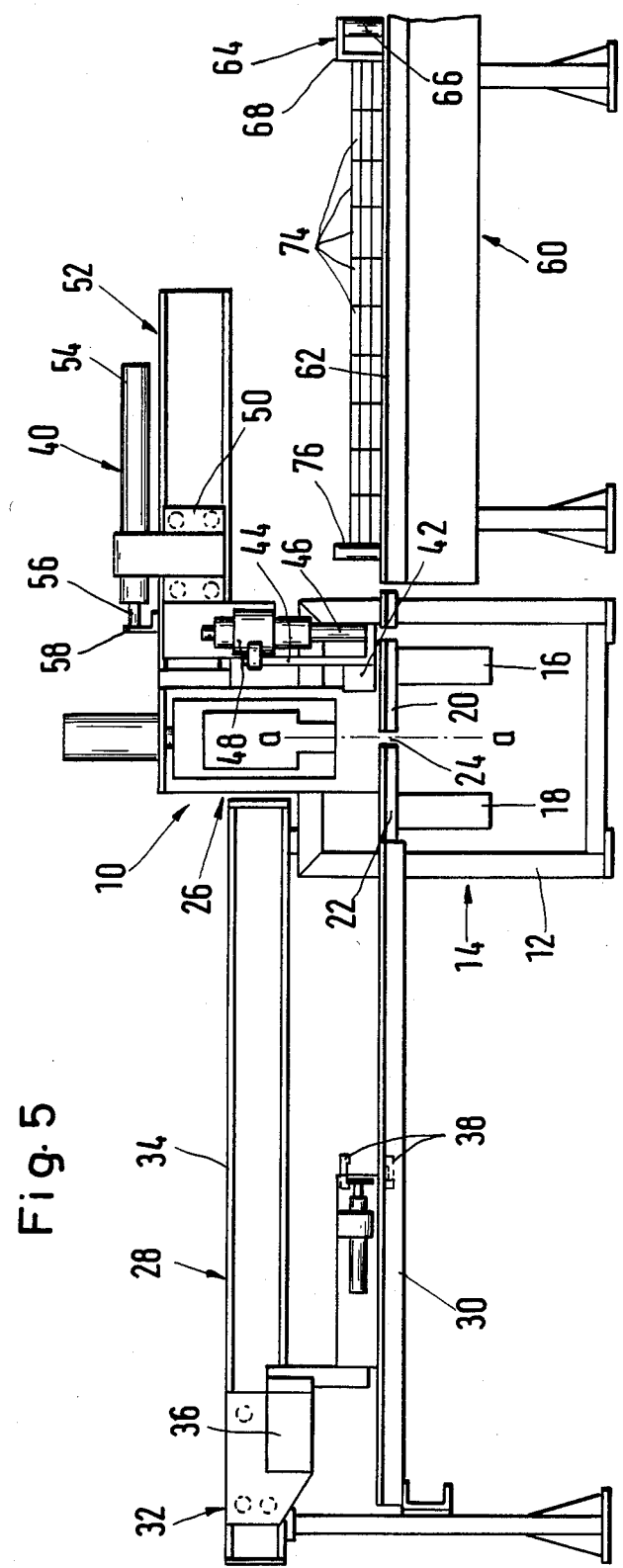

DEVICE FOR SUPPORTING A LONG AND NARROW WORKPIECE BUNDLE PRODUCED ON A PANEL SPLITTING SAW

The invention relates to a device for supporting at the longitudinal side a long and narrow workpiece bundle produced on a panel splitting saw, which is located opposite panel-type workpieces stacked on top of one another, which are to be split up into workpiece bundles and which may be fed by means of an advancing device horizontally and stepwise in the cutting plane to the panel splitting saw.

When panel-type workpieces stacked on top of one another are split up in a work program on panel splitting saws into a number of long and narrow workpiece bundles, the fully automatic sequence of operations can be acutely disturbed by the first workpiece bundle obtained after execution of an advancing motion which is usually abruptly interrupted, tilting over under the effect of inertial forces.

This is particularly disadvantageous if the workpiece bundles are to be pushed onto a transportation table, for example, a roller, for further processing, and are to be transported further from there.

Supervision of the advancing motions of such workpiece bundles and frequent manual intervention by the operating staff are therefore required.

The object underlying the invention is therefore to ensure that upon termination of the advancing of narrow workpiece bundles obtained in the splitting up of panel-type workpieces stacked on top of one another, for example, pressboard or plastic panels, at least the edges of the first workpiece bundle obtained remain flush, which therefore eliminates the necessity for supervision by the operating staff.

This object is attained in accordance with the invention by a device which is characterized by a counter holding member which is drivable parallel to the cutting plane from a position of rest into a stop position engaging the workpiece bundle and which is movable along with the workpiece bundle in the direction of advance.

By engaging and thus supporting at its free longitudinal side the first workpiece bundle obtained in the splitting up operation, the counter holding member prevents it from tilting over in the direction of advance upon termination of advance motions. The counter holding member therefore enables the speed of advance and thus the output of panel splitting saws to be substantially increased.

The counter holding member may be designed so as to support the workpiece bundle at two points located at a distance from one another. However, in the case of panel splitting saws with large lengths of cut, such saws may also be equipped with several, parallel-controlled devices according to the invention.

Transportation tables, in particular, in the form of roller tables, for example, connected downstream of panel splitting saws, for transporting such workpiece bundles, may just as well be equipped with the inventive device.

The counter holding member may be displaced together with the workpiece bundle by a control device at a speed coincident with the speed of advance.

A substantially simpler construction is obtained if the counter holding member may be dragged along by the workpiece bundle, in which case it should be ensured that upon interruption of the speed of advance, the motion of the counter holding member is also discontinued immediately.

In an advantageous embodiment of the invention, the counter holding member is of raisable and lowerable design, and it is expedient to arrange it on a guide carriage displaceable in the direction of advance, which may be braked when dragged along in the direction of advance and may be moved in the opposite direction by a resetting device.

If the device is to be associated with a panel splitting saw, it is expedient to arrange the guide carriage in a displaceable manner along a guide device arranged above the workpiece support plane.

If, on the other hand, the device is to be associated with a transportation carriage, an advantageous construction is obtained by the guide carriage being movable along a guide device arranged beneath the workpiece support plane, and, in particular, within the transportation table.

An embodiment of an inventive device is illustrated in the drawings, in which:

FIGS. 4 and 5 show illustrations similar to FIG. 3 to elucidate the mode of operation of both inventive devices.

Figure 1:
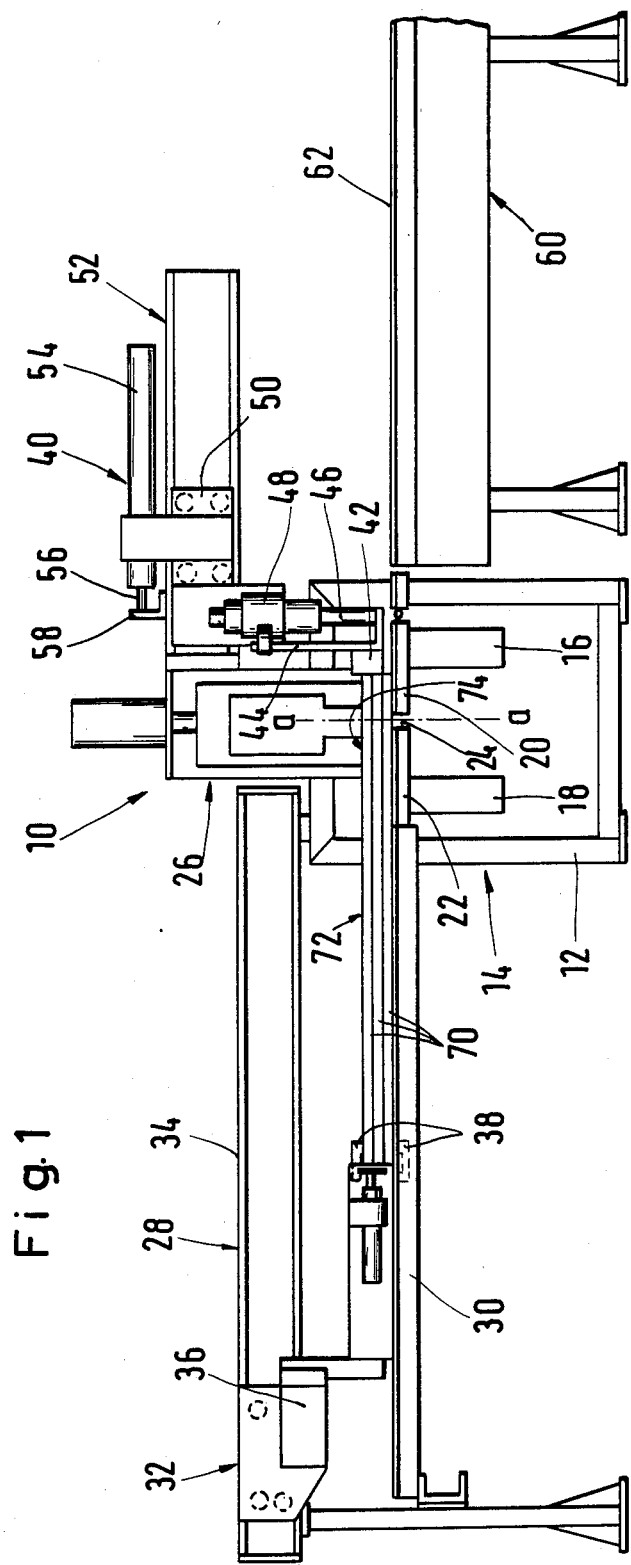
FIG. 1 is a side view of a known panel splitting saw, with a workpiece advancing device arranged upstream thereof and a workpiece transporting table arranged downstream thereof, with the panel splitting saw and the workpiece transporting table each being provided with an inventive device located in their initial starting position.

The panel splitting saw designated in its entirety by reference numeral 10 comprises a machine frame 14 provided at the ends with frame sections 12 and with two frame crossbeams 16, 18 which are arranged in parallel spaced relationship to each other, and between which a saw carriage which is not illustrated is adjustable perpendicularly to the drawing plane. This may be provided with one or two circular saw blades which are movable along the cutting plane a—a. Reference numerals 20 and 22 designate two table plates which form the machine table and between which a saw slit 24 is located, out of which the circular saw blade or blades of the saw carriage may emerge in an upward direction in order to split up workpiece panels. Designated in its entirety by reference numeral 26 is a clamping device arranged above the machine table 20, 22 and supported by the machine frame 14, with the aid of which workpieces which are to be split up on the machine table 20, 22 may be clamped.

Associated with the panel splitting saw 10 is a workpiece advancing device designated in its entirety by reference numeral 28 comprising a workpiece support table 30 adjoining the machine table 20, 22 and having associated with it, above it, a workpiece shifting member 32 which is automatically movable between two guide rails 34 in the direction of the panel splitting saw 10 through predetermined, programmed steps in order to execute advancing motions.

The workpiece shifting member 32 carries a cross-bar 36, with a number of collet chucks provided in a known manner thereon, which, viewed perpendicularly to the drawing plane, are arranged in spaced relationship to one another and serve to clamp a panel-type workpiece or a number of panel-type workpieces stacked on top of one another, to enable these to be carried along, for example, also against the direction of advance.

Built onto the panel splitting saw 10, at its side facing away from the workpiece advancing device 28 is an inventive support device 40. This comprises a counter holding member 44 which carries a counter holding stop 42 and may be raised and lowered by the piston rod 46 of a cylinder unit 48. In FIG. 1, it is shown in its lowered operating position. In the embodiment shown, it is assumed that the panel splitting saw 10 is provided with one support device 40 only, and the counter holding stop 42, viewed perpendicularly to the drawing plane, is of correspondingly long design. The cylinder unit 48 is held at a guide carriage 50 which is displaceable along a guide device 52 in the direction of advance of the workpiece advancing device 28.

Reference numeral 54 designates a cylinder unit which is carried by the guide carriage 50 and whose piston rod 56 is rigidly connected to a stationary holder 58. The guide device 52 is arranged above the machine table 20, 22 and extends over a transportation table 60 adjoining the panel splitting saw 10 and comprising on its upper side, for example, workpiece support bars 62 or a number of rollers arranged in rows.

Figure 3:
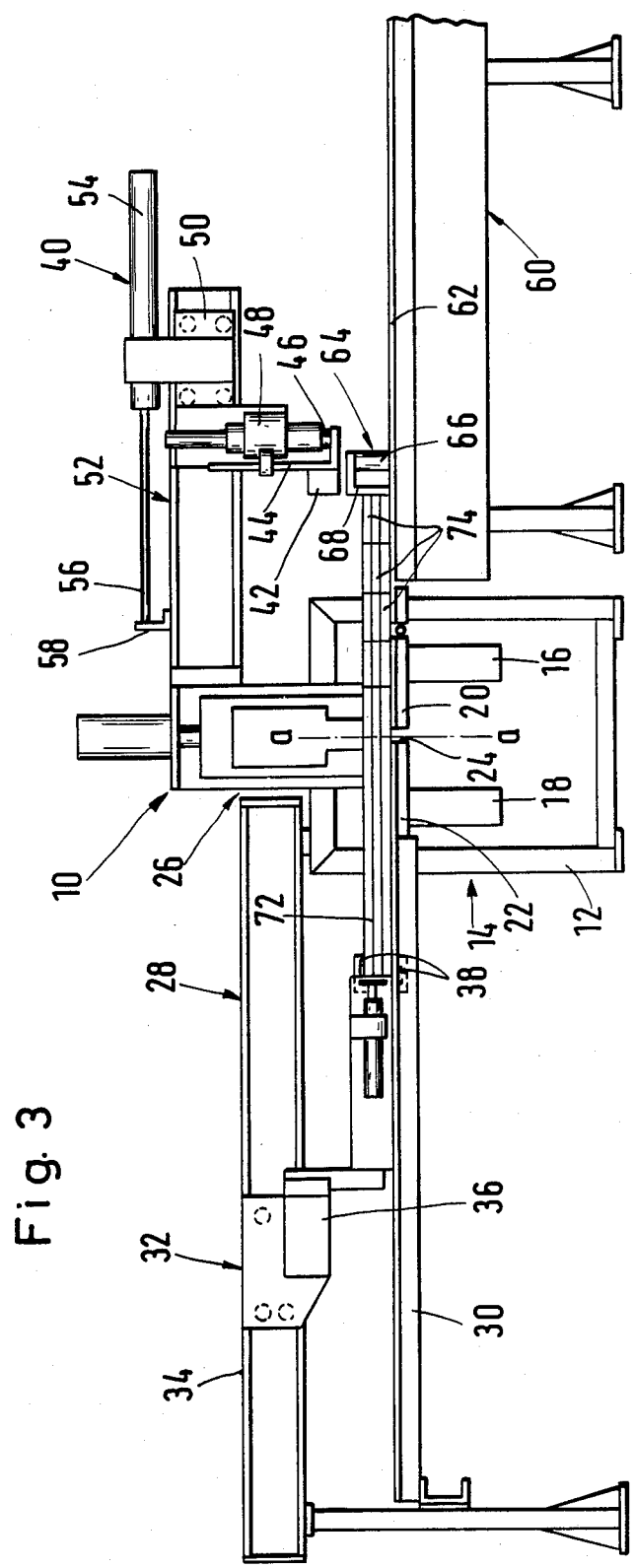
FIG. 3 shows an illustration similar to FIG. 2, with the device pertaining to the machine in its released position and the device pertaining to the table in its front support position.

As is apparent from FIG. 3, this transportation table 60 is also provided with a support device designated in its entirety by reference numeral 64, which is integrated into the transportation table 60 and of which only its counter holding member 68 which may be raised and lowered by a piston rod 66 of a cylinder unit is apparent. This support device 64 is displaceable in the direction of advance in a drive-free manner, while it is movable, in analogy with the support device 40, against the direction of advance by means of a drive device which is not illustrated.

Figure 2:
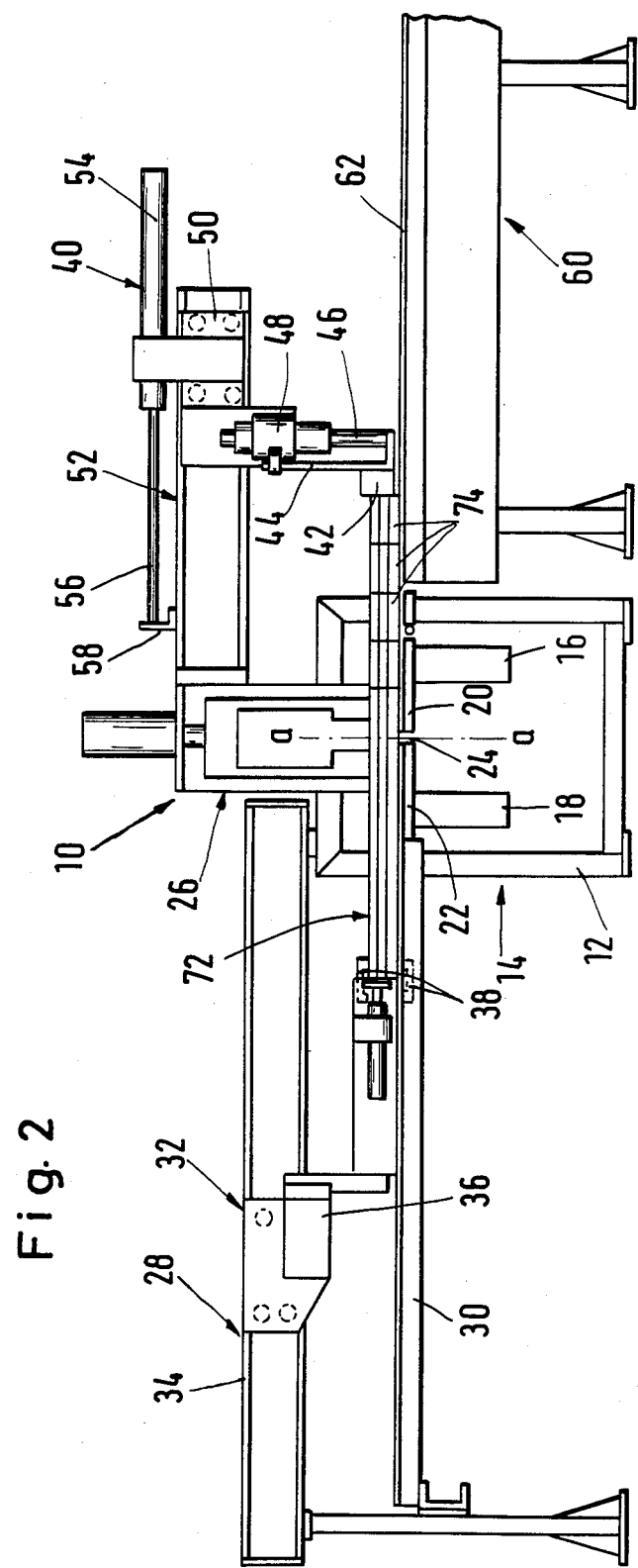
FIG. 2 shows an illustration similar to FIG. 1, with the device arranged on the panel splitting saw shown in its rear support end position.

Placed on the workpiece support table 30 of the workpiece advancing device 28 is a workpiece stack 72 composed, for example, of three panel-type workpieces 70, which is to be split up by the panel splitting saw 10, viewed perpendicularly to the drawing plane, into a number of narrow workpiece bundles 74. FIG. 1 shows the first workpiece bundle 74 obtained after a sawing operation, while part of the workpiece stack 72 has already been split up into workpiece bundles 74 in FIG. 2.

Before the first separating cut is made in order to produce the first workpiece bundle 74 in accordance with FIG. 1, the counter holding member 44 carrying the counter holding stop 42 is moved from its upper position of rest into its lower counter holding position shown in FIG. 1, in which the counter holding stop 42 is located close in front of the workpiece stack 72. After the workpiece bundle 74 has been severed from the workpiece stack 72, the workpiece shifting member 32 of the workpiece advancing device 28 becomes operative and pushes the workpiece stack 72, after it has been released by the clamping device 26, through such an amount in the direction of advance that a workpiece bundle 74 of, for example, the same width is obtained during the subsequent sawing operation. During the advancing of the workpiece stack 72, also the workpiece bundle 74 first severed, and via it, the counter holding member 44 or the guide carriage 50 of the support device 40 carrying it are carried along through a corresponding path. If the advancing motion is abruptly interrupted, the counter holding stop 42 ensures that the workpiece bundle 74 cannot tilt over in the direction of advance.

Figure 4:
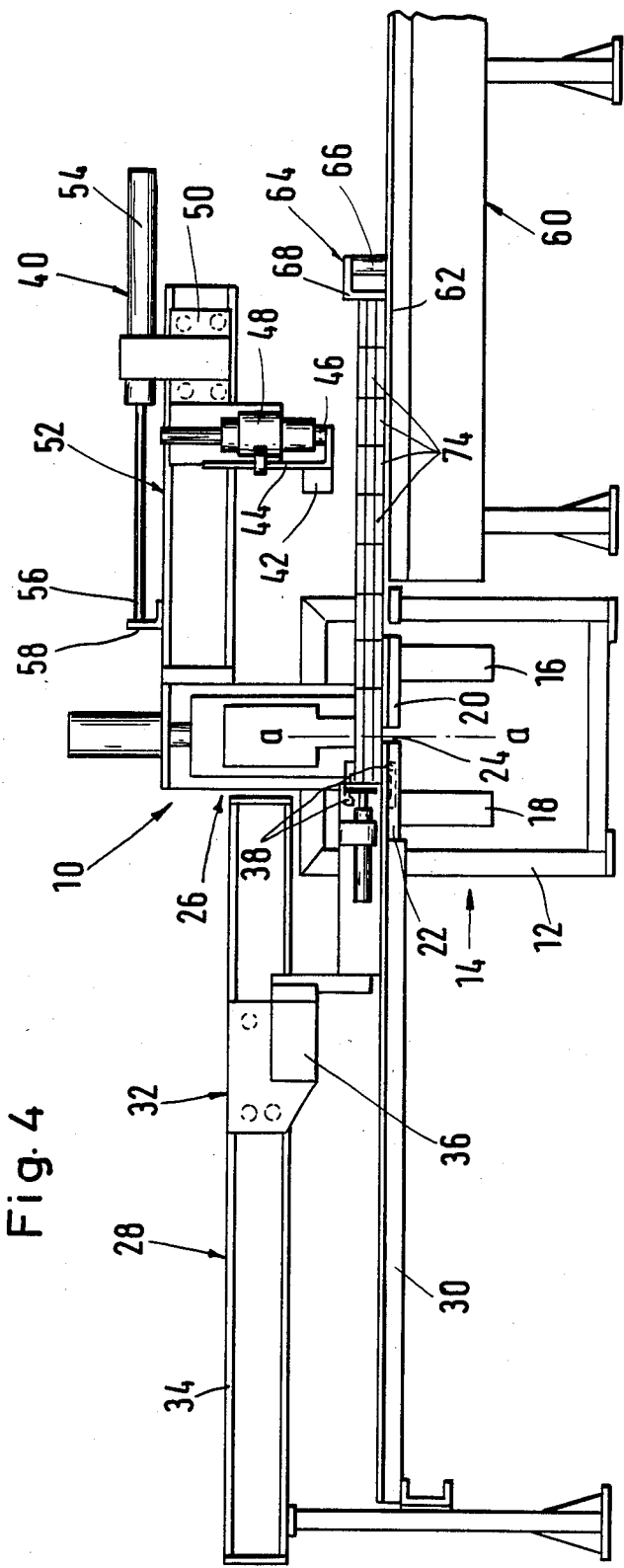

Once the counter holding member 44, viewed in the direction of advance, has reached its end position (FIG. 2), it is driven into its upper position of rest (FIG. 3), whereupon the supporting device 64 of the transportation table 60 becomes operative and its counter holding member 68 is driven upwardly out of the table surface to again ensure that in the course of the following advancing motions of workpiece stack 72 and workpiece bundles 74, these cannot tilt over. It is evident that the lowerable arrangement of the counter holding members 68 in the transportation table 60 necessitates the arrangement of at least two counter holding members 68 which, viewed perpendicularly to the drawing plane, are arranged in laterally spaced relationship to each other. During the advancing of the workpiece stack 72, these counter holding members 68 are also dragged along by the front workpiece bundle 74 (FIG. 4), and in the meantime, the counter holding member 44 of the support device 40 is driven back by the cylinder unit 54 into its starting position and after delivery of the split up workpiece stack 72 to the transportation table 60 has been completed, is lowered again into its operating position (FIG. 5), in which it may simultaneously be employed as stop for a new workpiece stack 72 which is to be split up.

When all of the workpiece bundles 74 have been delivered to the transportation table 60, these may be fixed for further transportation in a direction perpendicular to the drawing plane between the counter holding members 68 of the support device 64 provided in the transportation table and a stop which may be driven upwardly out of the transportation table.

What is claimed is:

1. A device for supporting a long and narrow workpiece bundle at the longitudinal side of said bundle, produced on panel splitting saw means defining a cutting plane, from one or more panel-type workpieces stacked on top of one another on a support surface, said device comprising:

advancing device means operably associated with said bundle so as to feed said bundle along the horizontal direction and stepwise across said cutting plane, in the direction of advance;

counter holding member means operably associated with said workpiece bundle and extendable substantially parallel to said cutting plane from a first rest position, to a second stop position serving to engage said workpiece bundle; and said counter holding member means further being operably associated with said advancing device means so as to move along said direction of advance, as said advancing device means feeds said bundle along said direction of advance.

2. The invention according to claim 1 wherein said counter holding member means is further operably associated with said workpiece bundle so as to be dragged along said direction of advance in response to advancement of said workpiece bundle.

3. The invention according to claim 1 wherein said counter holding member means further comprises at least one counter holding member operably associated with said workpiece bundle so as to be capable of selectively being raised into said first rest position and lowered into said second stop position.

4. The invention according to claim 3 wherein said counter holding member means further comprises:
- guide carriage means supporting said counter holding members and displaceable along said direction of advance; and
- resetting device means operably associated with said guide carriage means and said counter holding members, so as to substantially move said counter holding members along a direction substantially opposite to said direction of advance.

5. The invention according to claim 4 wherein said counter holding member means further comprises guide device means arranged above said support surface and operably associated with said guide carriage means, so as to enable displacement of said guide carriage means.

6. The invention according to claim 4 wherein said counter holding member means further comprises:
- a workpiece delivery table operably associated with said panel splitting saw means so as to receive said workpiece bundles; and
- guide device means arranged below said support surface and operably associated within said workpiece delivery table so as to prevent said bundles from tilting as they are moved along said direction of advance by said advancing means.

* * * * *

UNITED STATES PATENT AND TRADEMARK OFFICE
CERTIFICATE OF CORRECTION

PATENT NO. : 4,676,132

DATED : June 30, 1987

INVENTOR(S) : Detlef Jenkner

It is certified that error appears in the above-identified patent and that said Letters Patent is hereby corrected as shown below:

Column 1, line 24, "a roller," should read -- a roller table, --.

Column 5, line 10, "substantially move" should read -- selectively move --.

Signed and Sealed this

Twenty-second Day of December, 1987

Attest:

DONALD J. QUIGG

Attesting Officer      Commissioner of Patents and Trademarks